(No Model.) 2 Sheets—Sheet 1.
E. W. BARKER.
LENS.

No. 578,620. Patented Mar. 9, 1897.

Witnesses:   Inventor:
  Edward W. Barker (No Model.) 2 Sheets—Sheet 2.
E. W. BARKER.
LENS.
No. 578,620. Patented Mar. 9, 1897.
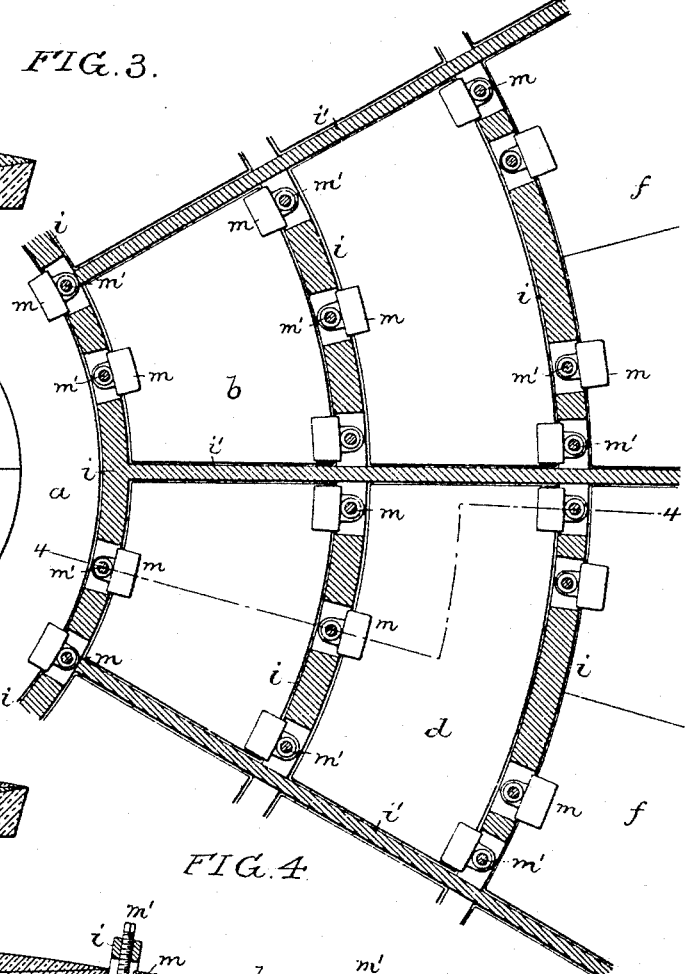

UNITED STATES PATENT OFFICE.

EDWARD W. BARKER, OF PHILADELPHIA, PENNSYLVANIA.

LENS.

SPECIFICATION forming part of Letters Patent No. 578,620, dated March 9, 1897.

Application filed August 13, 1895. Serial No. 559,171. (No model.)

*To all whom it may concern:*

Be it known that I, EDWARD W. BARKER, a citizen of the United States, residing in Philadelphia, Pennsylvania, have invented certain Improvements in Lenses, of which the following is a specification.

My invention relates to condensing or objective lenses for photographic, telescopic, or mechanical purposes, the object of my invention being to so construct such lenses that they can be made of any desired size and power with such an expenditure of labor and at such a cost as to permit of the construction of much larger and more powerful lenses than can now possibly be made.

Under the present practice of constructing lenses from glass of the full diameter of the lens the manufacture of large lenses is very difficult and expensive. The want of homogeneity in a large mass of glass and the trouble experienced in properly handling and grinding the same serve to prevent the manufacture of lenses of a diameter much in excess of thirty-six inches, and even lenses of this size can only be made at enormous cost. Furthermore, in the ordinary lens there is considerable loss of light due to the thickness of the glass and difficulty is experienced in correcting the spherical aberration of the lens. I overcome these difficulties by constructing a composite lens built up from independent segments, each so shaped and adjusted in respect to the others that all will have the same focus, the preferable form of lens consisting of concentric rings, each composed of a series of sections, these rings surrounding a central lens, which may be composed of glass of the full diameter of said central lens or may consist of a series of segments.

Figure 1:
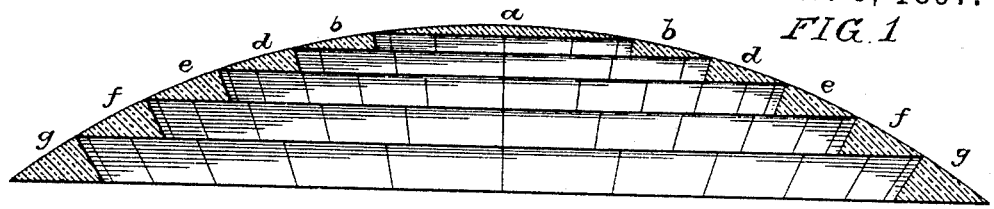
Figure 2:
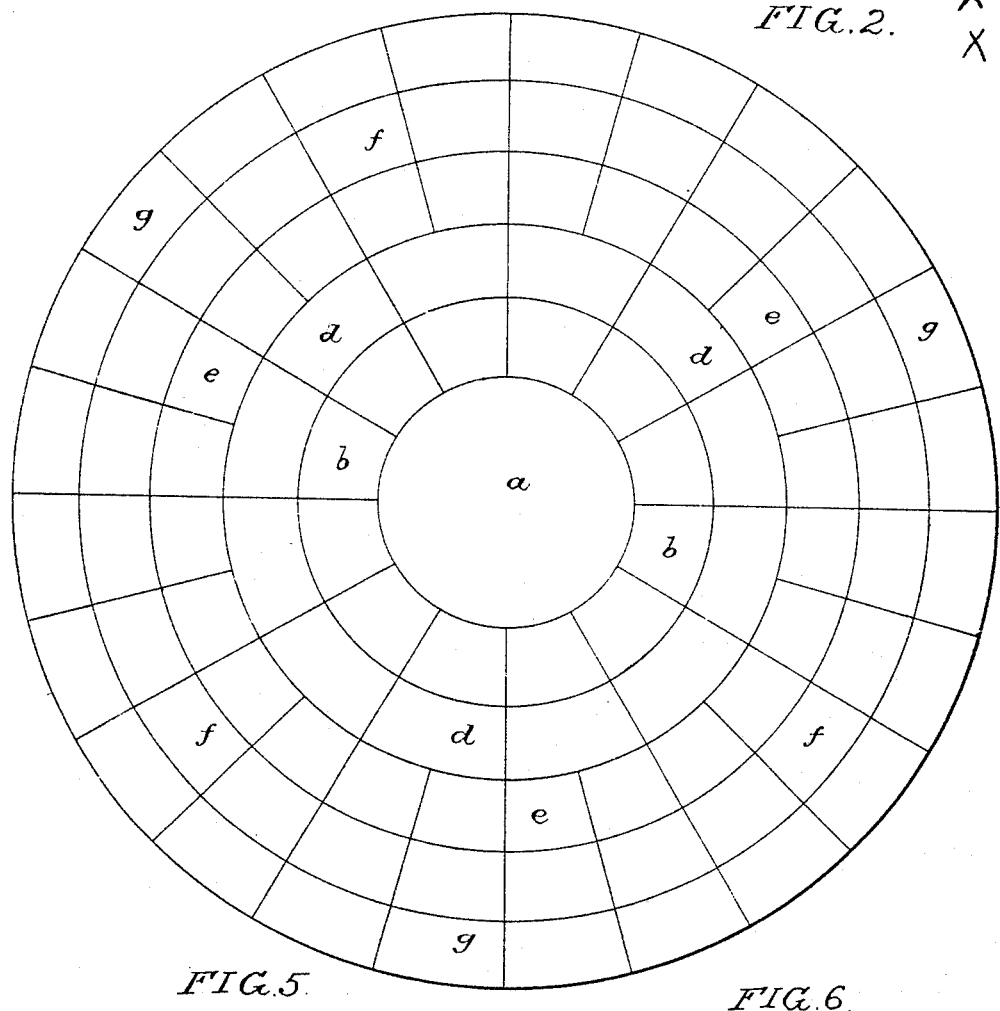

In the accompanying drawings, Figure 1 is a diagram showing in transverse section the sections or segments of a lens constructed in accordance with my invention. Fig. 2 is a plan or top view of the same. Fig. 3 is a plan view, partly in section and on a larger scale, of part of my improved composite lens, illustrating means which may be employed for supporting and adjusting the sections or segments of the lens. Fig. 4 is a longitudinal section on the line 4 4, Fig. 3; and Figs. 5 to 12, inclusive, are views illustrating either modifications or special features of the invention.

The lens shown in Figs. 1 and 2 is composed of a central plano-convex lens $a$ and a series of concentric prismatic lens-rings $b$, $d$, $e$, $f$, and $g$, each of these rings being composed of a number of segments, as shown in Fig. 2, all of the segments of which the lens is composed being so formed and adjusted as to focus at the same point.

The central lens, if plano-convex, is a solid generated by the revolution of an arc of suitable curvature and its sine about its versed sine, and each of the concentric rings of the lens, if plano-convex, is a solid generated by the revolution of the transverse arc presented by the outer face of the ring, its sine, and versed sine around the central axis of the composite lens. If the lens is to be double convex, the same rule is adopted in forming the outer and inner portions of the lens. The sines and versed sines referred to are preferably the focal sines and focal versed sines, although this is not absolutely essential to the proper carrying out of my invention as long as one of the inner faces of each of the lenses has the direction of the versed sine of that portion of the complete arc presented by the outer convex face of the lens which constitutes the outer face of each lens. By "focal sine" is meant that portion of the line drawn from the outer extremity of the transverse arc presented by the outer face of each annular lens normal to the central axis of the complete lens which is intercepted by the line drawn from the other extremity of said arc to the focal center of the lens, and by "focal versed sine" is meant that portion of the latter line which is intercepted by the line above defined as normal to the central axis of the lens.

This embodies the main idea of my invention without reference to any special means whereby the segments are supported and adjusted, since it is manifest that the segments might be properly adjusted to focus while they were being assembled and then secured in proper position by any suitable cementing agent. Special supporting and adjusting means, however, constitute another feature of my invention, and are fully described hereinafter.

It will be evident that with this method of construction a lens of any desired size can be made without carrying the cost of the same to a prohibitive figure, as the expense due to the difficulties involved in making large lenses from glass of the full diameter of the lens is avoided, each of the segments of the composite lens being easily handled and the pieces being relatively so small that the glass in each piece can be absolutely homogeneous. Only a minimum quantity of glass is employed in making the lens, thus reducing loss of light due to the thickness of the lens, and spherical aberration can be more effectively corrected than in a single large lens.

The great reduction in the quantity of glass used in making my improved lens and the corresponding increase in the light-transmitting qualities of the lens will be understood on reference to Fig. 1, the plano-convex outline of which represents the mass of glass which would be contained in a single lens of the same character, while the mass of glass contained in my improved lens is represented by the cross-sectioned portions of said figure.

It is practically impossible in such large lens to correct spherical aberration by a proper gradation of curvature from the center to the circumference, but in my improved composite lens spherical aberration can be much more readily corrected by increasing the radius of curvature of each zone of lenses successively receding from the center, this variation of curvature of the crown-glass lenses to be adopted in conjunction with the use of such achromatic concave flint-glass lenses as may be found upon careful computation and by experience to be best adapted to the attainment of the end in view. Spherical aberration may also be corrected by a special adjustment of the segments of the lens in respect to each other and to the central lens.

Figures 5, 6:

The central crown-glass lens may be double convex, as shown in Fig. 5, or, in order to cheapen or facilitate the construction of the same, it may consist of two plano-convex lenses mounted separately or having their two plane surfaces cemented together, as shown in Fig. 6, and the segmental lenses may also be either a segment of a double-convex lens, as shown in Fig. 7, or of two plano-convex lenses either mounted separately or cemented together, as shown in Fig. 8, the convex lens of crown-glass being used in connection with the ordinary plano-concave lens of flint-glass, as shown in each of the figures referred to. The central lens also, instead of being composed of glass of the full diameter of the lens, may consist of a number of segments, if desired, as shown in Fig. 9, although the former construction is preferable, as this lens will always be of comparatively small diameter and hence easily made without undue expense.

In order to provide for the ready adjustment of each segment of the lens, I use a series of rings $i$, suitably supported in proper position by means of radial bars $i'$ or other appropriate framework, and I provide the central lens, as well as each of the outer lens-segments, with clamps $m$, which engage with adjusting-screws $m'$, adapted to threaded openings in the rings $i$, the latter being slotted to permit of the desired play of the clamps therein in effecting the adjustment of the lens-segments, each segment being preferably provided with three clamps disposed at the angles of a triangle drawn through the lens-segment, such arrangement of the clamps providing for accurate adjustment of any part of the segment.

The pitch of the inner and outer edges of the lens-segments should trend to the principal focus of the lens, as should also the rings $i$ of the supporting-frame. After the lens-segments have been properly adjusted the spaces between the edges of the same and the supporting-frame should be closed by cement or other opaque substance to prevent the admission of light by any other path than through the lens-segments.

The lens-segments may, if desired, be adjustable in the clamps by the use of suitable wedges $n$, as shown, for instance, in Fig. 10, or by other available means, so that in adjusting the lens universal movement of each segment of the same will be permissible in order to effect proper focusing.

The construction of adjusting devices shown in Figs. 11 and 12 may in many cases be preferable to that shown in Figs. 3 and 4, as it provides for a more accurate and universal adjustment of the segments. In this case the ring $i$ has hollow bosses $s$, each carrying an adjusting-screw $m'$, which has collars engaging with an inner hollow block $s'$, the latter having an arm passing through a slot in the boss $s$ and connected to the clamp $m$.

Three equidistantly-disposed set-screws $t$, carried by the boss $s$, act upon the hollow block $s'$ and provide for any desired lateral or radial adjustment of the same demanded in properly setting the lens-segment.

I am aware that it has been proposed to construct a lens of a plurality of independent members or sections, each having the same focus and each constituted upon separate parts of the chord or sine of the whole arc, and I am also aware that a lens for lanterns and the like has been proposed in which a portion of the material of the lens is cut away in annular depressions on the reverse side of the lens, but in neither of such constructions is it possible to reduce the material to the minimum, as in my construction, where a single lens is composed of a central lens with one or more concentric lenses, and all of said lenses having their inner faces constituting the sine of its respective portion of the complete arc presented by the outer face of the lens.

Having thus described my invention, I claim and desire to secure by Letters Patent—

1. A composite lens in which a central lens is combined with a series of concentric annular lenses, all of the lenses being of the same focus, and one of the inner faces of each of the concentric annular lenses having the direction of the versed sine of that portion of the complete arc presented by the convex face of the lens, which constitutes the outer face of each lens, substantially as specified.

2. A composite lens in which a central lens is combined with a series of concentric annular lenses, all of the lenses having the same focus, and each of said concentric annular lenses being composed of separate segments, one of the inner faces of each of which has the direction of the versed sine of that portion of the complete arc presented by the outer convex face of the lens which constitutes the outer face of each lens, substantially as specified.

3. A composite lens consisting of a central lens and one or more concentric annular lenses, all of said lenses having the same focus, and one of the inner faces of each lens having the direction of the versed sine of that portion of the complete arc presented by the outer convex face of the lens which constitutes the outer face of each lens, substantially as specified.

4. A composite lens consisting of independent segmental lenses, so formed as to have the same focus and combined with means for independently mounting and adjusting the same.

5. A composite lens consisting of a central lens and a series of concentric annular lenses composed of segments, in combination with means whereby each segment is supported and adjusted independently of the others.

6. The combination in a lens, of the central lens, a series of concentric annular lenses composed of sections, supporting-rings alternating with said annular lens-rings, and adjusting-screws carried by said supporting-rings, and provided with means for engaging with the lens-sections, substantially as specified.

7. The combination in a lens, of the annular lens-rings composed of segments, the intervening annular supporting-rings, adjusting-screws carrying hollow blocks which support the segments, and radial screws for laterally adjusting said hollow blocks, substantially as specified.

In testimony whereof I have signed my name to this specification in the presence of two subscribing witnesses.

EDWARD W. BARKER.

Witnesses:
FRANK E. BECHTOLD,
JOS. H. KLEIN.